United States Patent Office 3,429,720
Patented Feb. 25, 1969

3,429,720
MATERIALS HAVING HIGH CORROSIVE RESISTANCE TO ATTACK BY FLUORINE AT CRYOGENIC TEMPERATURES AND METHOD OF PREPARING THEM
Harry H. Houston, Elmhurst, Gerald A. Keitel, Park Ridge, and William R. Williamson, Normal, Ill., assignors to Borg-Warner Corporation, Chicago, Ill., a corporation of Illinois
No Drawing. Filed Apr. 18, 1960, Ser. No. 22,665
U.S. Cl. 106—39        6 Claims
Int. Cl. C04b 41/26; B01l 11/00

Our invention relates to sintered fluoride compounds and more particularly to such compounds having a high oxidation resistance to liquid fluorine. We have prepared ceramic sintered compounds of this type and tested them for use with respect to corrosive attack by liquified fluorine. We found that these sintered ceramics, hereinafter more specifically described, also have a high resistance to thermo-shock and a high degree of hardness. They are dense, have a good frictional surface and a low wearing rate when used as components such as bearings and bearing seals for pumps. Sintered compounds of this type find a further application as linings in tanks and pipes for handling fluorine. We have found that the most feasible substances for preparing fluoride ceramics are those in which fluorine comprises a basic part of the structure, particularly salts of alkaline earth and the rare earth series hereinafter shown. They can be readily pressed and sintered and yield a dense, hard compact which is shock and corrosive resistant.

It is, therefore, an object of this invention to provide chemically stable sintered compacts that are serviceable in cryogenic fluorine systems.

It is a principal object of this invention to provide sintered fluoride compounds for making bearings and bearing seals in the fabrication of special pumps which are corrosive resistant to liquid fluorine.

It is another principal object of this invention to provide a method for making chemically stable sintered compacts that are serviceable in cryogenic fluorine systems.

It is a further object of this invention to provide sintered compacts comprising calcium fluoride and metal powders such as antimony, cobalt and nickel.

It is another object of this invention to provide sintered compacts comprising barium fluoride including metal powders such as antimony, cobalt and nickel.

It is still a further object of this invention to provide sintered compacts for making bearings and bearing seals which comprise calcium fluoride and barium fluoride.

It is also another object of this invention to provide sintered compacts for making bearings and seals, comprising calcium fluoride, barium fluoride and metal powders such as antimony, cobalt and nickel.

It is well known that special glasses can be produced by smelting fluoride salts of magnesium, calcium, strontium, barium, lead, lanthanum, aluminum and beryllium. These, in proper ratios, produce glass for special optical use as shown in U.S. Patent No. 2,578,325. Also, Patent No. 2,577,627 discloses a phosphate glass which is highly resistant to hydrofluoric and fluorides in general. We propose to produce fluorine compacts for uses as heretofore disclosed by special processes which include compression of powdered components before firing, which at relatively low firing temperatures, produces a compact of high strength; oxidation resistant to fluorine at cryogenic temperatures; has low porosity, high resistance to thermo-shock; and with respect to use as bearings and bearing seals, provides a satisfactory frictional surface and a low wearing rate.

EXAMPLE I

We prepared fluorine resistant sintered compacts which comprised 80% powdered calcium fluoride by weight and 20% powdered barium fluoride by weight. These powders were calcined in a platinum dish at 1600 degrees F. for approximately 30 minutes. They were then introduced into a ball mill and ground about 4 hours using alumina grinding balls whereby a complete blending of the components was effected and reduced to a particle size of approximately −200 mesh. These blended powders were kept dry at all times and quickly weighed to prevent contamination and moisture pick up. A die having an annular cavity of 1 in. O.D. x ¼ in. I.D. x ¼ in. was provided. The cavity of the die was then filled with these blended powders which required about 8.0 grams. A green binder comprising 5% paraffin wax in carbon tetrachloride in quantities to completely wet the blended powders was added. Other green binders such as paraffin, starch, carboxymethyl cellulose or Methocel may be used. A pressure of 20,000 p.s.i. was then applied after which the formed powdered specimen was removed from the die and dried for 45 minutes in a drying oven at 100 degrees C. after which it was fired in a muffle furnace 1700 degrees F. for 4 hours.

A specimen was also fired in a stationary muffle for longer periods of time ranging from 3 to 15 hours. Experiments showed that higher strengths were obtained in the stationary muffle over longer periods. Longer firing time appeared to indicate that grain growth was more extensive and in some cases solid state reactions were more extensive.

Other fluorine resistant sintered compacts, hereinafter shown in Tables I and II, were also formed by the same process, using dies of various configurations. Included in our experiments were sintered compacts formed from powders of calcium fluoride and barium fluoride and powders of metals selected from a group consisting of cobalt, antimony, nickel, silver, iron, aluminum, tin stainless steel and copper.

It should be noted that when firing these compacts the sintering temperature must be such that the blend of the components will not fuse completely. Specimens were sintered at a temperature of from 1500° F. to 1700° F. for a period of time to produce a porosity of less than 0.5 percent. Temperatures must be held at a point consistent with the formation of a sintered body having sharp, well-defined edges.

When sintered fluorine compacts are prepared from the group which contain metal powders, as hereinafter shown in Tables I and II, these metal powders are added at the time the components are introduced into the ball mill. Drying the formed specimen for a period of from 40 to 60 minutes at from 80° C. to 100° C. before firing was found to be desirable.

The following Tables I and II show fluorine compacts of various types which were tested with results as shown. The rare earth fluoride shown in Table I comprises a mixture of the fluoride salts of Ce, La, Nd, Pr, Gd, Sm and Y which contain about 26% fluorine and about 20% inert materials.

found to be highly resistant to thermal shock and oxidation resistant to liquid fluorine.

TABLE I

| Components | Firing Temp. F.° | Corrosive attack | Thermoshock | Compressive strength (p.s.i.) |
|---|---|---|---|---|
| $CaF_2$ | 1,600 | None | Satisfactory | (1) |
| $BaF_2$ | 1,600 | do | do | (1) |
| 80% $CaF_2$ + 20% $BaF_2$ | 1,650 | do | do | 2,500 |
| 95% (4$CaF_2$+$BaF_2$) + 5% Co | 1,650 | do | do | 9,000 |
| 90% (4$CaF_2$+$BaF_2$) + 10% Co | 1,650 | do | do | 7,430 |
| 85% (4$CaF_2$+$BaF_2$) + 15% Co | 1,650 | do | do | 7,100 |
| 80% (4$CaF_2$+$BaF_2$) + 20% Co | 1,650 | do | do | 5,800 |
| 75% (4$CaF_2$+$BaF_2$) + 25% Co | 1,650 | do | do | 5,000 |
| 90% $CaF_2$ + 10% Sn | 1,600 | do | do | (1) |
| 90% $CaF_2$ + 10% Ag | 1,600 | do | do | (1) |
| 80% (4$CaF_2$+$BaF_2$) + 20% rare earth fluoride | 1,600 | do | do | (1) |
| 50% $CaF_2$ + 50% rare earth fluoride | 1,600 | do | do | (1) |
| 90% (4$CaF_2$+$BaF_2$) + 8% rare earth fluoride + 2% Pb | 1,600 | do | do | (1) |
| 100% mixed rare earth fluorides | 1,600 | do | do | (1) |

1 Not tested.

TABLE II

| Components | Firing Temp. F.° | Corrosive attack | Tensile strength | |
|---|---|---|---|---|
| | | | In air | In liquid N. |
| 4$CaF_2$+$BaF_2$ | 1,650 | None | 6,640 | 7,500 |
| 95% (4$CaF_2$+$BaF_2$) + 5% Sb | 1,650 | do | 8,920 | 15,700 |
| 95% (4$CaF_2$+$BaF_2$) + 5% Ni | 1,650 | do | 8,200 | (1) |

1 Not tested.

Resistance to attack by liquid fluorine was determined by suspending the compact in liquid fluorine by means of a copper wire.

The thermo-shock testing of various compacts consisted of rapid imersion of the specimen into liquid nitrogen, submergence for 10 minutes, removal from nitrogen, and return to room temperatures. This cycle was repeated three times and the samples examined after each cycle with a microscope for evidence of gross thermal shock failure. A nitrogen medium was used because it obviated the use of highly poisonous fluorine in an open container. Also, the test was thermally more severe because of the lower liquifying temperature of nitrogen.

When the sintered compounds comprising calcium fluoride, barium fluoride and antimony metal were subjected to X-ray diffraction for phase identification, it was found that they contain barium antimonate. The present method thus can be used for producing ferroelectric titanates such as $SrTiO_3$ and $BaTiO_3$. Normally, discs pressed from these metal oxides in the process of making ferroelectric products, must be sintered at 1300 degrees C. (2372 degrees F.) for about two hours to produce a ceramic of optimum density. However, ferroelectric products can be made by compressing pellets from compounds made of fluoride powders, such as barium fluoride and metal powder, such as titanium and firing them at 1600–1700 degrees F., for approximately one hour thereby saving time and temperature.

A fluorine glass composition consisting of ingredients shown in Example II below was completely vitrified and under tests by the method disclosed in this specification were less shock resistant at cryogenic temperatures than compacts which were made of the same material, fritted, ground, fabricated, compressed at 8000 p.s.i. and fired at 1850 degrees F. This glass frit was also blended with 5–70% additions of powdered metals such as brass, copper, bronze, tin and aluminum and processed as described in this specification. The resultant compacts were

EXAMPLE II

| Composition: | Percent |
|---|---|
| $MgF_2$ | 9.2 |
| $CaF_2$ | 11.0 |
| $SrF_2$ | 7.3 |
| $BaF_2$ | 8.2 |
| $PbF_2$ | 9.2 |
| $LaF_3$ | 8.2 |
| $BeF_3$ | 22.9 |
| $Al(PO_3)_3$ | 8.5 |
| $AlF_3$ | 15.5 |

The loss of fluorine, in compacts processed as disclosed in our specification, was slight. Compacts prepared with calcium fluoride and barium fluoride, when fired at 1600 degrees F., showed a loss from 0.1% and 0.7% of fluorine respectively; they were found to be superior to the other fluoride salts for forming into cold pressed parts. They produced a more glassy structure under the sintering conditions employed.

We claim:

1. A sintered fluorine resistant composite article consisting essentially (1) from about 80% calcium fluoride and correspondingly about 20% barium fluoride.

2. A sintered fluorine resistant composite article consisting essentially of calcium fluoride and at least one powdered metal selected from the group consisting of cobalt, antimony, nickel, silver, iron, aluminum, tin and stainless steel, the said calcium fluoride constituting in excess of 50% by weight of said composite article.

3. A sintered fluorine resistant composite article consisting essentially of barium fluoride and at least one powdered metal selected from the group consisting of cobalt, antimony, nickel, silver, iron, aluminum, tin and stainless steel, the said barium fluoride constituting in excess of 50% by weight of said composite article.

4. A sintered fluorine resistant composite article consisting essentially of 20% by weight barium fluoride, 75% by weight calcium fluoride, and 5% by weight of at least one powdered metal selected from the group consisting of cobalt, antimony, nickel, silver, iron, aluminum, tin and stainless steel.

5. A fluorine resistant composite article consisting essentially of (1) from about 75% to 95% by weight of a material selected from the group consisting of barium fluoride and calcium fluoride and correspondingly (2) from about 25% to 5% by weight of powdered metal selected from the group consisting of cobalt, antimony, nickel, silver, iron, aluminum, tin and stainless steel.

6. A process for making sintered fluorine resistant composite articles for use as bearings and seals which comprises calcining powders consisting essentially of from about 75% to 95% by weight of a 4:1 molar ratio of calcium fluoride and barium fluoride correspondingly and adding thereto 25% to 5% by weight powdered metals selected from the group consisting of cobalt, antimony, nickel, silver, iron, aluminum, tin, stainless steel and copper; further reducing particle size of said powders in a ball mill; adding a green binder to said powders to form a mix; introducing said mix into a die; applying pressure of up to about 20,000 p.s.i. to said die to thereby form a cohesive specimen; removing said specimen from the said die, placing said specimen in an oven; and heating said specimen at a temperature from 1500° F. to 1700° F. for a period of time to sinter the specimens to a porosity of less than 0.5 percent.

References Cited

UNITED STATES PATENTS

| | | | |
|---|---|---|---|
| 1,770,395 | 7/1950 | Frevert | 75—55 |
| 2,301,456 | 11/1942 | Sabine. | |
| 2,966,433 | 12/1960 | Van Der Willigen et al. | 106—286 |
| 3,027,227 | 3/1962 | Coxey | 23—88 |
| 2,184,078 | 12/1939 | Hyde | 106—39 X |

FOREIGN PATENTS

| | | |
|---|---|---|
| 662,493 | 12/1951 | Great Britain. |
| 766,885 | 1/1957 | Great Britain. |
| 781,372 | 8/1957 | Great Britain. |
| 788,669 | 1/1958 | Great Britain. |

OTHER REFERENCES

Renfrew et al., "Polytetrafluorethylene," I.E.C., September 1946, (pp. 870–877).

HELEN M. McCARTHY, *Primary Examiner*.

U.S. Cl. X.R.

106—47, 63; 252—12; 75—201; 103—114; 277—227, 235, 237; 264—65